J. M. GILMORE.
DEVICE FOR THE MANUFACTURE OF DENTAL CROWNS.
APPLICATION FILED SEPT. 30, 1910.
999,366.
Patented Aug. 1, 1911.
2 SHEETS—SHEET 1.
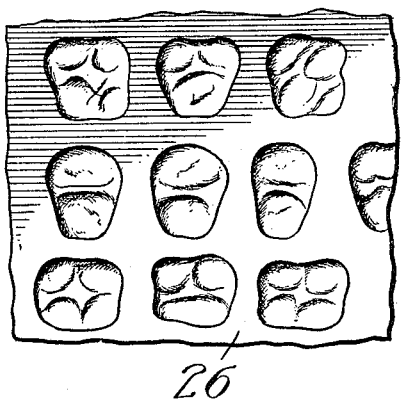
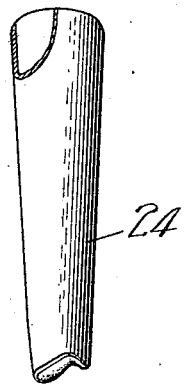
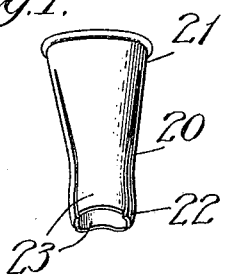
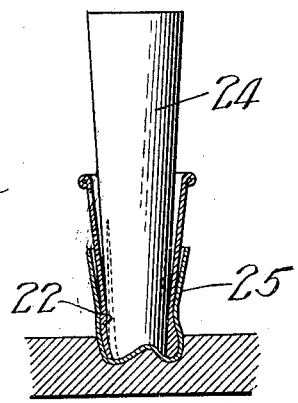
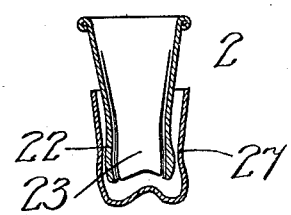
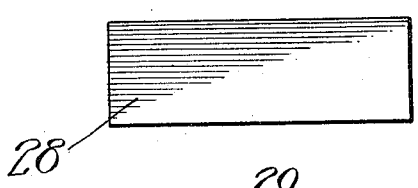
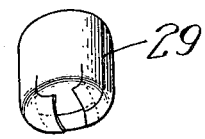
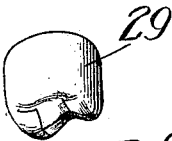
Witnesses:
Chas. E. Taylor,
Chas. H. Bull.
Inventor:
John M. Gilmore,
By Dyrenforth, Lee, Chritton and Wiles,
Attys.
COLUMBIA PLANOGRAPH CO., WASHINGTON, D. C.

J. M. GILMORE.
DEVICE FOR THE MANUFACTURE OF DENTAL CROWNS.
APPLICATION FILED SEPT. 30, 1910.
999,366.
Patented Aug. 1, 1911.
2 SHEETS—SHEET 2.
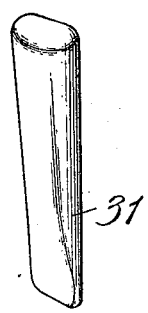
Fig. 10.
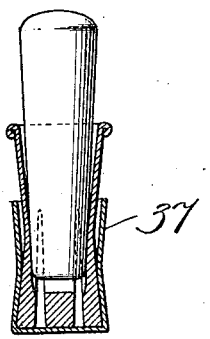
Fig. 11.
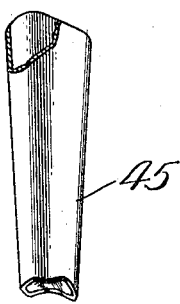
Fig. 16.
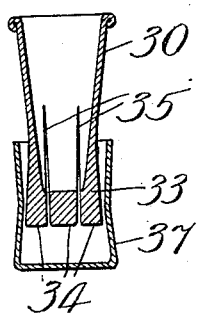
Fig. 12.
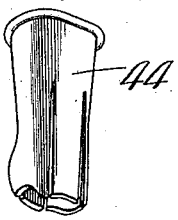
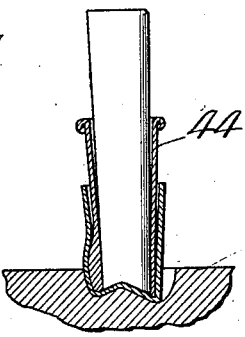
Fig. 17.
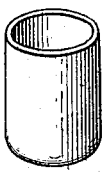
Fig. 14.
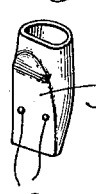
Fig. 13.
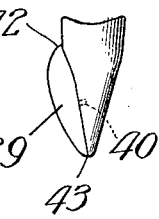
Fig. 15.
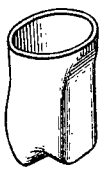
Fig. 18.
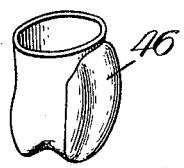
Fig. 19.
Witnesses:
Inventor:
John M. Gilmore,
By Dyrenforth, Lee, Chritton & Wiles,
Attys.
COLUMBIA PLANOGRAPH CO., WASHINGTON, D. C.

UNITED STATES PATENT OFFICE.

JOHN M. GILMORE, OF CHICAGO, ILLINOIS.

DEVICE FOR THE MANUFACTURE OF DENTAL CROWNS.

999,366. Specification of Letters Patent. Patented Aug. 1, 1911.

Application filed September 30, 1910. Serial No. 584,614.

*To all whom it may concern:*

Be it known that I, JOHN M. GILMORE, a citizen of the United States, residing at Chicago, in the county of Cook and State of Illinois, have invented a new and useful Improvement in Devices for the Manufacture of Dental Crowns, of which the following is a specification.

My invention relates particularly to devices for manufacturing crowns for teeth, either for capping them, providing dummy crowns for bridge-work, or producing porcelain shell-crowns.

The manufacture of crowns especially for capping teeth, as hitherto practiced, is not only expensive and requires a relatively high degree of skill, but is a long and tedious operation and productive of great pain and discomfort to the patient. The most commonly practiced method involves the formation of a band and cusp in separate parts and the subsequent uniting of the same, this method presenting among the most serious objections, the great amount of time involved in the operation, the fitting and refitting of the band, both before and after the cusp is united to it, and the necessity, which occurs in almost every case, of shaping the cusps, which are of relatively thick metal, by filing or polishing the metal to cause the occlusal portions of the cusp to present the desired shape and size, with consequent loss of time and waste of precious metal.

My object is to provide improvements in devices for the manufacture of crowns to the end of facilitating and reducing the time required for their manufacture, cheapening the cost thereof, and sparing the patient pain and discomfort.

My invention is illustrated in the accompanying drawings, in which—

Figure 1 is a perspective view of a former and plunger employed together with a cap or thimble from which a crown can be made, the parts referred to being shown in their relative positions but unassembled. Fig 2. is a similar view of the parts illustrated in Fig. 1 showing them in assembled condition preparatory to the forming of the crown. Fig. 3 is a plan view of a portion of a die-plate commonly employed by dentists for shaping cusps of crowns, and which may be used in connection with the parts shown in Figs. 1 and 2. Fig. 4 is a view in elevation of the parts illustrated in Fig. 2, the former and cap being shown in section, this view showing the positions the parts assume after the swaging operation for shaping the cap into a crown has been performed. Fig. 5 is a view similar to Fig. 4, showing the condition of the former with relation to the formed crown after the plunger has been removed. Fig. 6 is a perspective view of the finished crown. Fig. 7 is a plan view of a sheet metal blank from which a cap to be formed into a crown may be made. Fig. 8 is a perspective view of the cap formed from the sheet of Fig. 7. Fig. 9 is a similar view of a crown formed from the cap of Fig. 8. Fig. 10 is a view like Fig. 1 of the former and plunger employed, together with a tube-section from which a crown for supporting a porcelain facing may be made. Fig. 11 is a view in elevation of the parts illustrated in Fig. 10, the former and cap being shown in section, this view showing the positions the parts assume after the swaging operation for shaping the tube has been performed. Fig. 12 is a view like Fig. 11 showing the condition of the former with relation to the formed crown after the plunger has been removed. Fig. 13 is a perspective view of the crown formed by the devices of Fig. 10. Fig. 14 is a similar view of a porcelain facing. Fig. 15 is a view of the finished porcelain-faced crown. Fig. 16 is a view like that of Fig. 1 showing the parts for forming the metal portion of a porcelain-faced crown for a bicuspid. Fig. 17 is a view like Fig. 4 of the parts shown in Fig. 16, this view illustrating how these parts may be used in connection with a die-plate for forming the crown. Fig. 18 is a perspective view of the metal portion of the crown formed from the devices of Fig. 16; and Fig. 19, a perspective view of the finished porcelain-faced crown.

For the purpose of illustrating my invention in its application to the manufacture of crowns wholly of metal, I have chosen to show it for forming crowns for posterior teeth, and more particularly bicuspids.

In carrying out my invention, as for instance in the manufacture of crowns for bicuspids, I employ a former 20 open at both ends, one end being flared as illustrated at 21, and the other end, represented at 22, being shaped to conform to the contour of the sides of the perfect bicuspid. The end 22 of the former, which is preferably constructed of thin metal, is formed of sections 23 united at the flared end of the former, these sections being shown as four in number, though the number may be varied as desired. The former 20 is preferably so constructed as to cause its end 22 to be of the same shape, but slightly smaller than the smallest bicuspid, the sections 23 being disconnected from each other along lines corresponding to the developmental lines of a tooth, in order that the former in being expanded as hereinafter described will conform to standard bicuspids of all sizes. Coöperating with the former 20 is a plunger 24 preferably constructed of metal and tapering toward one end as illustrated. The sides of the smaller end of the plunger are of approximately the same shape as those of the end 22 of the former 20.

To construct a crown for a bicuspid, the operator first prepares the tooth to be crowned by removing the enamel. The circumference of the stub of the tooth is then measured and a cap selected, which may be of the seamless variety illustrated at 25 in Fig. 1, or formed from a sheet of metal as hereinafter described, and which is of the same internal circumference as the outer circumference of the tooth stub. The operator then inserts the end 22 of the former into the cap 25 and the plunger 24 into the larger end of the former to the positions illustrated in Fig. 2. The plunger 24 is then forced into the former 20 to cause the sections 23 of the latter to spread apart into close engagement with the wall of the cap 25, the portion of the crown which is to encircle the tooth remaining unstretched in this operation. This may be done by hand, as the metal of the cap which I prefer to employ is comparatively thin gold, or other suitable metal, and readily conforms to the shape of the end 22 of the former 20. The operator may use a burnishing, or other suitable, tool for giving the cusp-portion of the crown the proper conformation.

If desired, the crown may be formed by applying the closed end of the cap to a die-plate, such as that represented in part at 26, when the cap 25 is positioned on the former 20 as described, and thereupon striking the upper end of the plunger 24 a light blow, which will cause the cap 25 to be drawn to a shape conforming to the shape of the end 22 of the former with cusp-portions formed thereon produced by forcing the plunger into the particular die in the die-plate to which the cap was applied, the different dies on the plate 26 permitting the operator to form cusp-portions on the cap 25 of any shape desired, the operator in thus selecting the die for coöperation with the plunger, being guided by the shape of the tooth which, with the one to be crowned, forms a pair. After the crown has been formed the plunger may be readily withdrawn from the former 20, whereupon the end 22 of the former contracts to normal condition as represented in Fig. 5, permitting the crown indicated at 27 to be readily removed from the former. Should the crown 27 for any reason require to be re-shaped, it may be readily replaced on the former 20 and the operation just described be repeated until the crown has been shaped as desired, the ductility of the metal of the cap permitting of the re-shaping thereof without impairment. In the operation of re-shaping the crown 27, when desired, a hand burnishing-tool (not shown), may be used for bending the metal of the cap to produce the desired conformation of the crown, the former 20 in this operation serving to readily support the crown and prevent it from collapsing.

After the crown has been shaped as desired, it is preferred that a small quantity of relatively hard solder be dropped into the inverted crown to thicken the cusp-portion thereof so that it will stand the wear to which it is subjected in use.

In Fig. 8, I have illustrated a cap made from a piece of suitable metal, such as 22 carat gold, bent to thimble form, instead of drawn, as in the case of the cap 25. The cap of Fig. 8 may be formed from the rectangular sheet of metal indicated at 28 in Fig. 7. In practice, the sheet would be of a length corresponding to the circumference of the stub of the tooth to be crowned and the sheet bent to the form illustrated in Fig. 8, whereupon the ends of the strip would be braised or soldered together at their meeting edges indicated at 29. An edge of the tube thus formed should be slit in preferably four places and the free ends thus bent to the overlapping condition represented in Fig. 8. The cap thus produced is then ready to be formed into the crown illustrated in Fig. 9. After the crown of Fig. 9 has been formed, the overlapping edges of the metal forming the cusp-portion of the crown should be soldered and smoothed off.

My invention also has great utility in the manufacture of porcelain crowns. In this case the shell-crowns formed as hereinbefore described, should be of metal the melting point of which is higher than the fusing point of porcelain, these shell crowns affording with matrices hereinafter described, molds into which the porcelain may be introduced and baked, the porcelain crown thus produced corresponding to the contour of the inner, and consequently the outer, surface of the shell-crown. In this operation, the tooth-stump to be crowned, after the enamel has been removed, should preferably be shouldered at or below the gum edge and a covering of sheet metal the same as that of which the crown is made, should be burnished over the stump to form a matrix. The matrix should then be removed and the shell-crown filled with wet porcelain, placed over the matrix, and the whole baked in an electric oven. After the porcelain has cooled, an opening should be made in the shell-crown at its occlusal portion for receiving more wet porcelain and the baking operation repeated, these alternate filling and baking operations continuing until the space between the matrix and the shell-crown is completely filled with baked porcelain, whereupon the porcelain crown thus formed can be readily removed from the shell-crown in any suitable manner.

In Figs. 10 to 19 inclusive I have shown an embodiment of my invention for forming metal shell backings for porcelain crowns. The drawings show means for forming the shells for both anterior and posterior teeth. Referring particularly to Figs. 10 to 15 inclusive, the former and plunger, corresponding with the former 20 and plunger 24 of Fig. 1, are represented at 30 and 31 respectively. The former in this case is shaped to conform as nearly as possible to a perfect incisor excepting in thickness, its front side being flat as represented at 32. The end 33 of the former is formed in sections 34 by slitting the metal thereof as represented at 35, thus adapting the end 33 of the former to be expanded under the action of the plunger 31 when the latter is forced into the former. The blank from which the crown is formed is preferably in the form of a tapering tube represented at 36 and open at both ends, this tube being of any suitable ductile metal and into which the former is introduced at its expansible end 33, as represented by the construction shown in Figs. 1 and 2. The plunger 31, which conforms in shape to the incisor to be crowned, is then introduced into the larger end of the former 30 and forced into intimate engagement with the sections 34, thus causing the latter to spread apart and draw the tube 36 to a shape conforming to that of the end 33 of the former 30, as shown in Fig. 10. Withdrawal of the plunger 31 from the former 30 permits the sections 34 to spring toward each other and thus the crown represented at 37 is free to be withdrawn from the former 30. The crown 37 thus formed presents a flat side 38 to which the porcelain facing 39 is applied and held in place, as by the fingers, while the operator inserts a burnishing-tool between the upper end of the crown and the former, preferably with the plunger inside of the former, and burnishes the crown to cause the gingival portion thereof to fit against the upper portion of the porcelain facing. The crown is thereupon secured to the flat surface 38 of the facing, as by metal pins 40 carried by the latter and extending through openings 41 in the flat side 38 of the crown to the wall of which they may be soldered or otherwise fastened. After the facing 39 has been secured to the crown, the metal of the upper and lower edges of the front portion of the crown may be burnished to make smooth the joints represented at 42 and 43 between the facing 39 and the crown. While I prefer to employ a tube 36 open at both ends as the blank from which to form the crown, it will be understood that a cap having a closed end may be employed in lieu thereof. It will also be understood that the tube or cap may be of the variety formed by drawing the metal to shape and thus rendering it seamless, or formed from a sheet of metal the edges of which are soldered together.

In Figs. 16 and 17 I have illustrated an embodiment of my invention for forming shell-crowns for porcelain-faced bicuspids, the former and plunger represented at 44 and 45 respectively, being the same as those represented at 20 and 24, excepting in thickness, the former 44 having one side flattened to cause a crown formed thereon to be of less thickness than the finished crown and present a flat side to receive a porcelain facing such as that represented at 46. In forming the crown for a bicuspid, the die-plate 26 may be used as described of the construction shown in Figs. 1 to 6 inclusive, though the shaping of the cap upon the former 44 may be performed by a burnishing or other suitable tool.

In practice, a former for each tooth, and a plurality of plungers of different sizes for coöperation with each former would be provided for making crowns to fit all teeth and all sizes of the same. If desired, plungers and formers varying slightly in conformation from perfect teeth may be provided for use where the crowns to be made vary from the shape of perfectly formed teeth, though by burnishing with tools as hereinbefore stated, the crowns formed from formers and plungers conforming in shape to perfect teeth, may be caused to present almost all of the irregularities found in teeth.

From the foregoing description, it will be manifest that the operation of forming crowns may be quickly and economically performed, the patient saved much time and discomfort, and a high degree of work accomplished. Furthermore, by my improved means stretching of the band-portions of the crowns, as is common in prior methods of manufacture, is prevented, thus insuring the perfect fit of the crowns upon the tooth-stubs.

It is preferred that the plungers be formed of relatively soft metal, such as type-metal, held against expansion by a shell of relatively tough metal, such as copper, German silver or other suitable metal, as illustrated in the drawings, it being preferred that the plungers be formed by forming a tube of the desired shape and thereupon filling the tube with the desired molten metal. By thus forming the end of the plunger which extends into the former, impairment of the end of the cap as by fracturing and the spreading or upsetting of the end of the plunger, is prevented.

What I claim as new and desire to secure by Letters Patent, is—

1. In a device for manufacturing crowns and the like, the combination with an expansible and contractible hollow former formed of relatively movable sections disconnected along lines corresponding to the developmental lines of the tooth and adapted to be inserted into a tubular blank from which the crown is to be formed, a plunger insertible in the said former, said plunger having a terminal die face and being provided with means for expanding said former and shaping said blank when forced into said former.

2. In a device for manufacturing dental crowns and the like, the combination with an expansible and contractible hollow former formed of a series of resilient arms, separated on the developmental lines of the tooth, and adapted to be inserted into a tubular blank from which the crown is to be formed, a plunger insertible in the said former, said plunger having a terminal die face and being provided with means for expanding said former and shaping said blank when forced into said former.

3. In a device for manufacturing dental crowns and the like, the combination with an expansible and contractible hollow former formed of a tube split at one end thereof on lines corresponding to the developmental lines of the tooth to form sections adapted to be moved with relation to each other, said former being adapted to be inserted into a tubular blank from which the crown is to be formed, a plunger insertible in the said former, said plunger having a terminal die face and being provided with means for expanding said former and shaping said blank when forced into said former.

4. Means for the purpose set forth comprising, in combination, an expansible and contractible former adapted to be inserted into a tubular blank from which the crown is to be formed, and a plunger insertible into said former for expanding it and formed of an outer shell of relatively hard metal and a core of relatively soft material operating to force the end of the blank into the depressions of a die-plate, for the purpose set forth.

5. Means for the purpose set forth comprising, in combination, an expansible and contractible former adapted to be inserted into a tubular blank from which the crown is to be formed, and a plunger insertible into said former and formed of a shell of relatively hard metal, an end of which conforms generally to the shape of the cusp of a tooth, and a core of relatively soft material, for the purpose set forth.

JOHN M. GILMORE.

In presence of—
 WILLIAM B. DAVIES,
 WILLIAM T. JONES.

---

Copies of this patent may be obtained for five cents each, by addressing the "Commissioner of Patents, Washington, D. C."